Oct. 8, 1957   E. W. POTTMEYER   2,808,849
VALVE OPERATOR MECHANISM
Filed Oct. 9, 1951   5 Sheets-Sheet 2

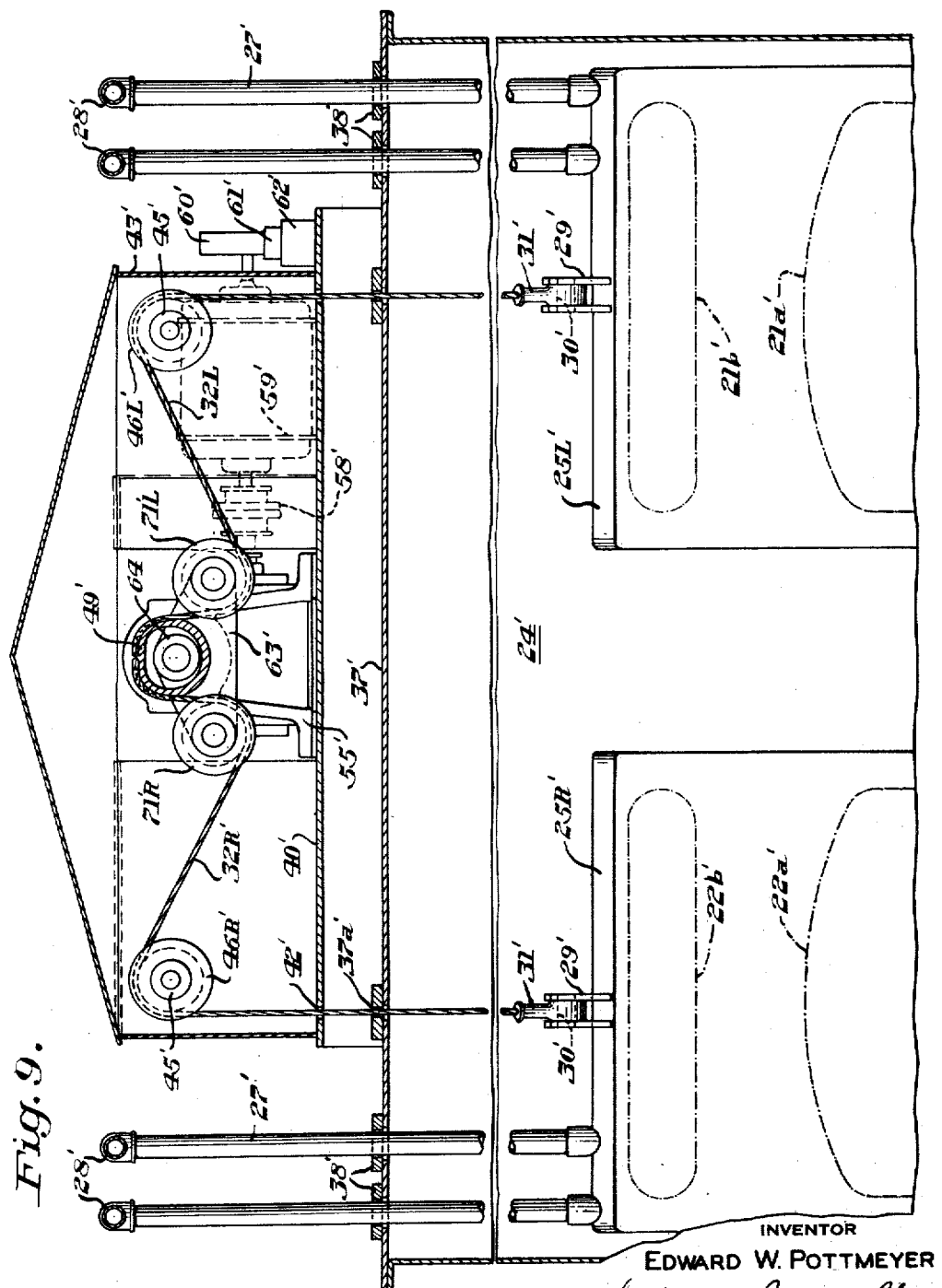

INVENTOR
EDWARD W. POTTMEYER
by Hooper, Leonard & Glenn
his attorneys

Oct. 8, 1957  E. W. POTTMEYER  2,808,849
VALVE OPERATOR MECHANISM
Filed Oct. 9, 1951  5 Sheets-Sheet 3
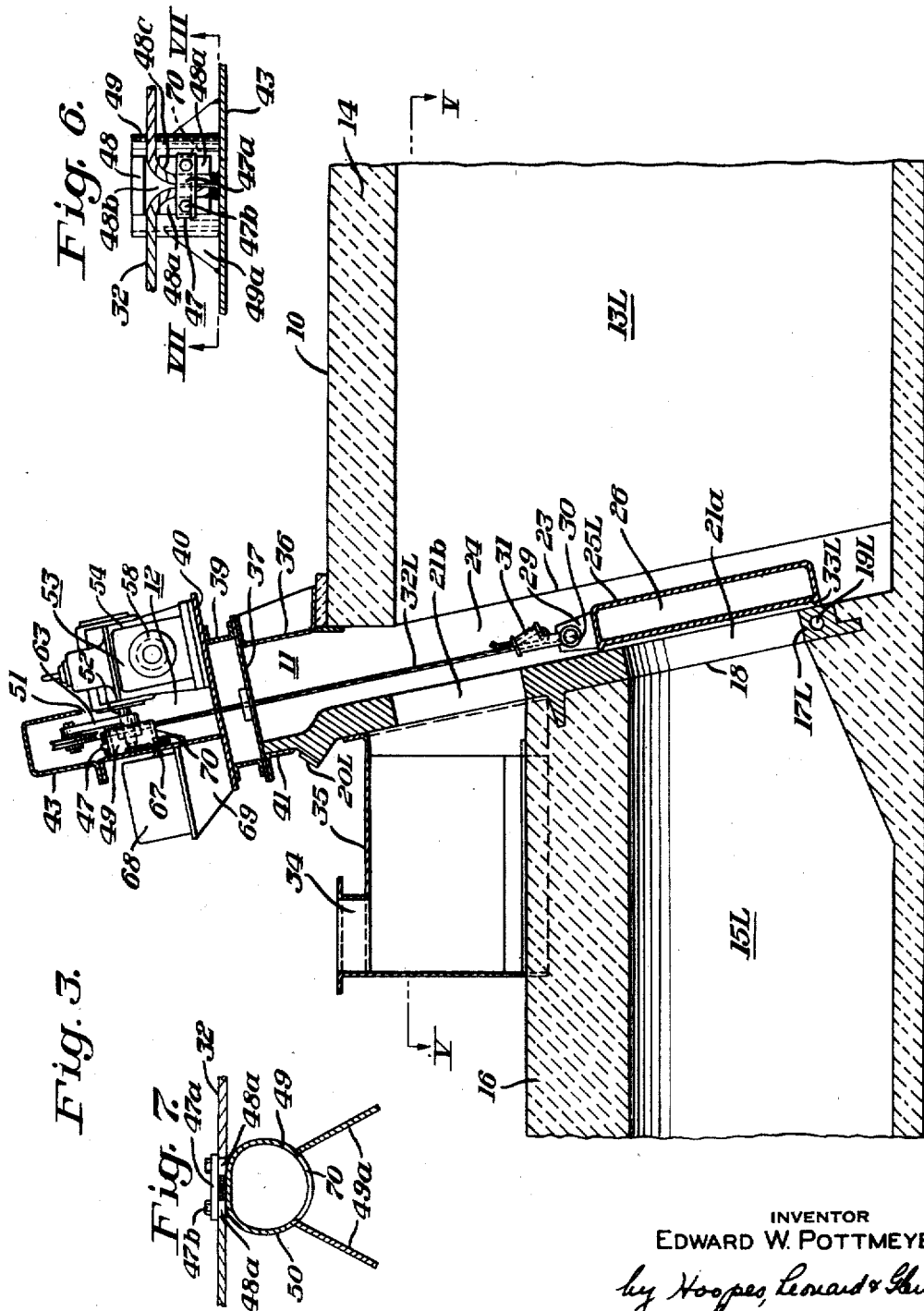
INVENTOR
EDWARD W. POTTMEYER
by Hoopes, Leonard & Stern
his attorneys Oct. 8, 1957 E. W. POTTMEYER 2,808,849
VALVE OPERATOR MECHANISM
Filed Oct. 9, 1951 5 Sheets-Sheet 4
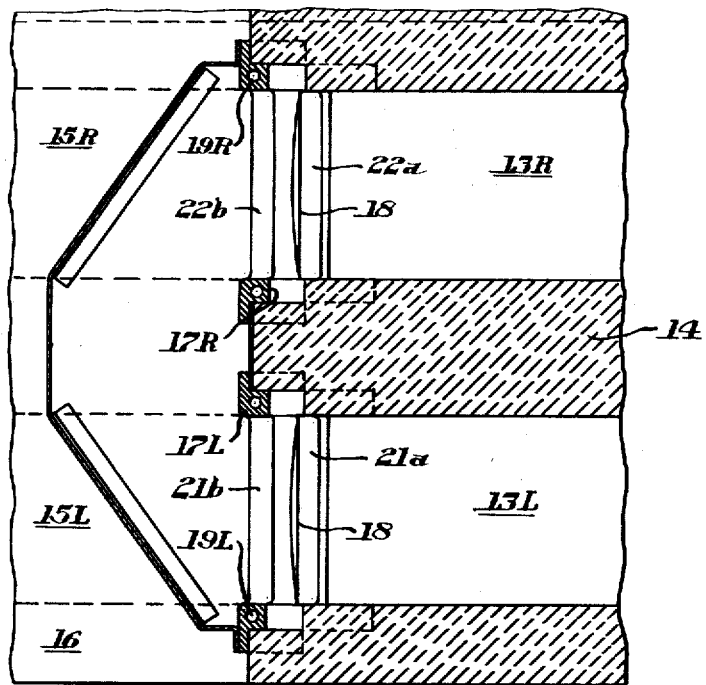
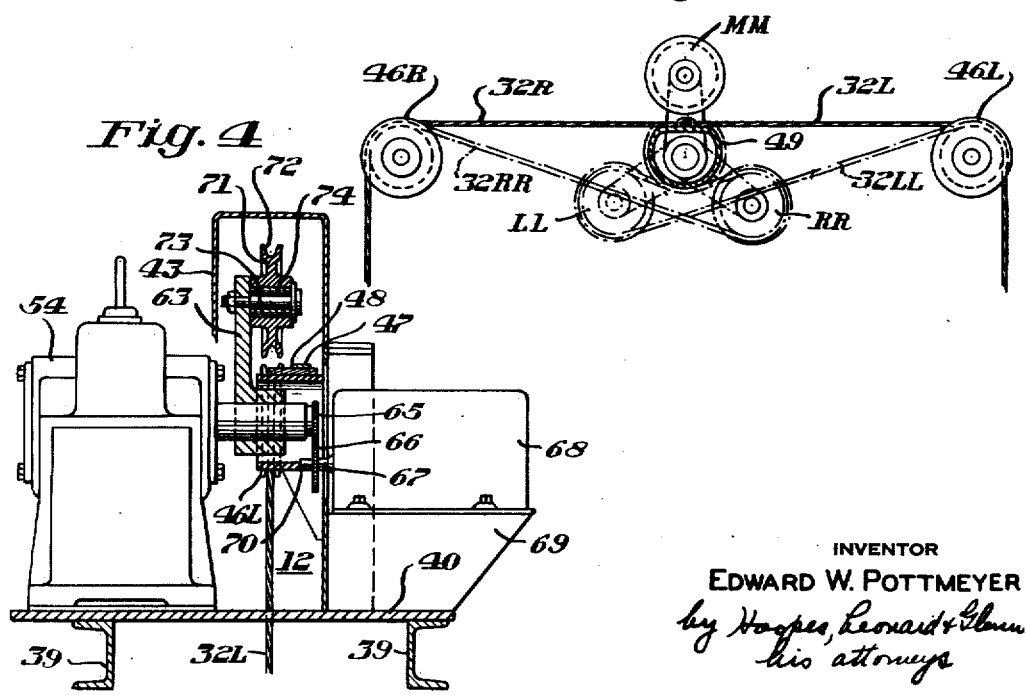
INVENTOR
EDWARD W. POTTMEYER
by Hoopes, Leonard & Glenn
his attorneys Oct. 8, 1957  E. W. POTTMEYER  2,808,849
VALVE OPERATOR MECHANISM
Filed Oct. 9, 1951  5 Sheets-Sheet 5
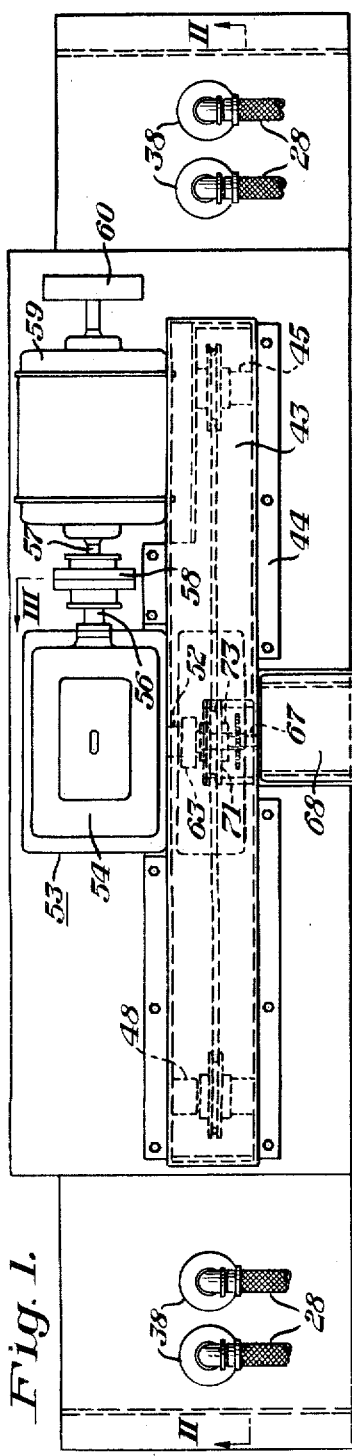
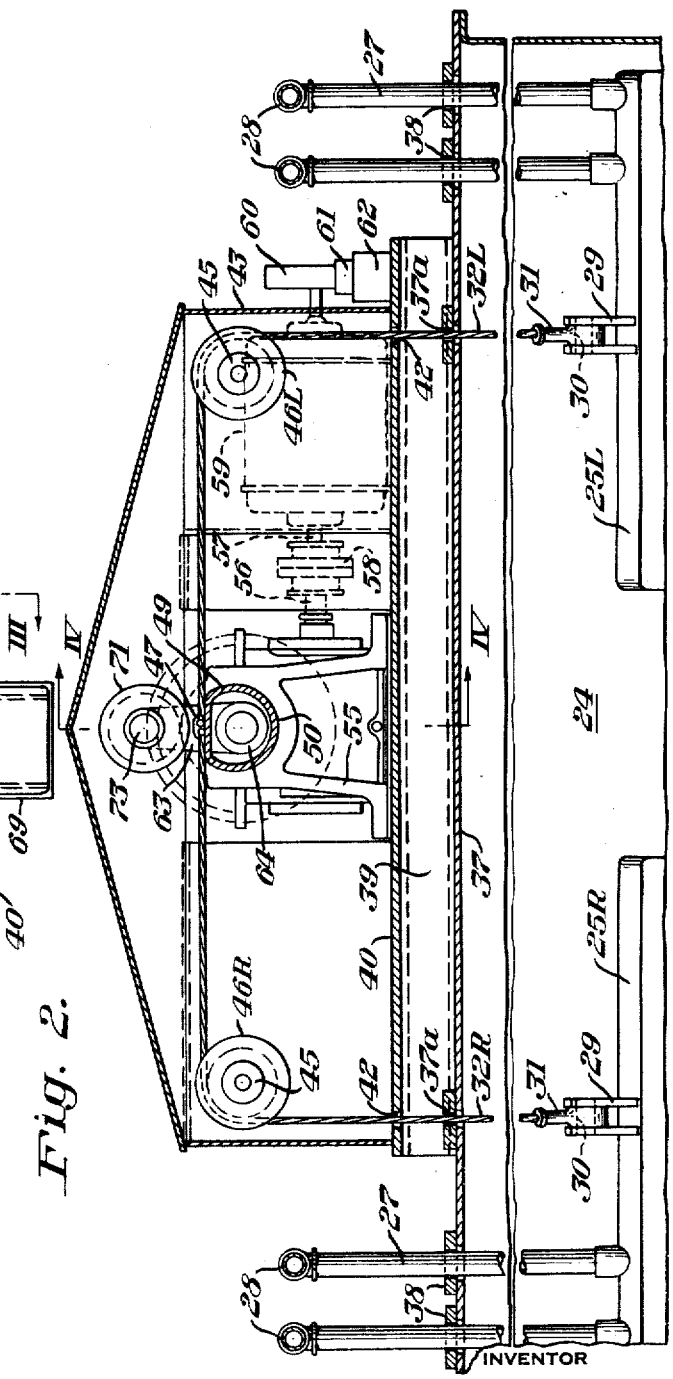
INVENTOR
EDWARD W. POTTMEYER
by Hooper, Leonard & Glenn
his attorneys

United States Patent Office 2,808,849
Patented Oct. 8, 1957

2,808,849

VALVE OPERATOR MECHANISM

Edward W. Pottmeyer, Pittsburgh, Pa., assignor, by mesne assignments, to Blaw-Knox Company, Pittsburgh, Pa., a corporation of Delaware Application October 9, 1951, Serial No. 250,398

8 Claims. (Cl. 137—309)

This invention relates to a valve operator mechanism of especial value in operating one or more valves moved by flexible cables. More particularly, this invention pertains to a valve operator mechanism for operating reversing furnace valves such as are used in many industries including the steel industry.

Reversing valve assemblies for use in soaking pits and in open-hearth steel furnaces and other reversing or regenerative furnaces have been used for many years. In general, the operator mechanism for the valves has been located at a distance from the valves themselves and frequently has been placed on a separate floor or deck of the plant. Thereby, a larger amount of equipment was required and material service and maintenance expense was incurred to install and keep it in operation while opportunities for breakdown and wear were increased. For example, in one prior practice each furnace opening for the air and gas conduits was provided with an individual valve each separately connected to an operating mechanism which produced alternation of movement. Even where a single valve was employed for an entire side of the furnace to control the gas and air ports for that side, extensive cable systems and relatively complicated operating mechanisms were heretofore required. In the case of steel mill soaking pit reversing furnaces, it is frequently desirable to "bottle up" the furnace by closing the air and gas ports for prescribed periods on both sides of the furnace at the same time. Such "bottling up" has not been heretofore practicable with a valve operator located adjacent the valves themselves.

In the valve operator mechanism and system of this invention, the deficiencies of the various prior practices have been overcome. Thus, my new valve operator mechanism can be constructed in the form of a simple unit of few parts which can be placed adjacent the valve or valves to be operated. In that new unit, means are provided for moving a valve at such predetermined times and in such reversing arrangement as may be selected. Moreover, provision may be made by means of my invention for bottling up a furnace such as a soaking pit furnace in addition to moving the valves to alternate the gas flow. In addition, if desired, this invention can be applied so as to alternate and/or bottle up the air flow to the furnace at the same time that the gas flow is regulated. A construction embodying my new valve operator mechanism is relatively simple and inexpensive both in installation and in maintenance aspects. Moreover, it provides relatively sensitive operation with full scope for any change desired in the timing cycle or sequence.

Other objects and advantages will be apparent from the following description and from the drawings, which are illustrative only, in which Figure 1 is a plan view of one embodiment of my new valve operator mechanism and system installed on a reversing furnace;

Figure 2 is a view in elevation taken along line II—II of Figure 1;

Figure 3 is a view in elevation taken along line III—III of Figure 1, which view also shows a valve assembly and furnace ports adjacent thereto;

Figure 4 is a view in elevation and partly in section taken along line IV—IV of Figure 2 illustrating in part the unit assembly character which the new valve operator mechanism of this invention may take;

Figure 5 is a view in plan taken along line V—V of Figure 3 illustrating a part of the valve assembly and furnace adjacent thereto to which the embodiment of the new valve operator mechanism and system of Figure 1 has been applied;

Figure 6 is an enlarged plan view of a drum and cable fastener which may be used in the embodiment illustrated in Figures 1 to 4;

Figure 7 is a view in elevation showing a section of the structure of Figure 6 taken along line VII—VII of Figure 6;

Figure 8 is a schematic view of the embodiment shown in Figures 1 and 2 in three operative positions which may be included within a single operative sequence;

Figure 9 is a view similar to Figure 2 but illustrating another embodiment of my new valve operating mechanism and system;

Figure 11:
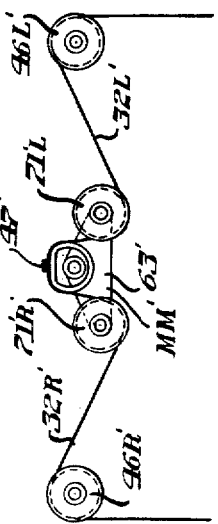
Figures 11-13, inclusive, are views of three possible positions of my new valve operator mechanism embodiment illustrated in Figures 9 and 10 which may be included in a timing cycle or sequence.

Referring to Figures 1 to 8, inclusive, of the drawings, a conventional reversing furnace 10 may be provided with a valve assembly 11 with which a unit 12 embodying my new valve operator mechanism has been combined. That portion of furnace 10 illustrated in Figures 3 and 5 may comprise a pair of furnace ducts 13R and 13L in side-by-side arrangement, such ducts being built usually of a ceramic material 14. Similarly, a pair of stack ducts 15R and 15L may be provided in alignment with the respective furnace gas ducts 13R and 13L, ceramic material 16 again usually being the construction material employed.

A pair of double-deck valve seats 17R and 17L may be provided and set in the masonry around the edge 18 of the respective stack ducts 15R and 15L. The edges 18 slant upwardly and away from the furnace gas ducts 13R and 13L. Each valve seat may be made of cast iron or other suitable metal and provided with a cooling passage 19R and 19L respectively through them. Capped connections 20L affording entry to passage 19L are provided in valve seat 17L and similar provision may be made for valve seat 17R. As shown in Figure 3, valve seat 17L is provided with a pair of superposed ports respectively numbered 21a for gas exhaust and 21b for air admission. A similar pair of ports respectively numbered 22a and 22b extend through valve seat 17R. It will be apparent that the new invention may be applied not only to double-deck arrangements but also to single-deck arrangement in furnaces arranged, for example, to have air admitted thereto at locations apart from the furnace gas exhaust to the stack. Again, although my new valve operator mechanism is shown employed in a reversing valve combination, the principle thereof may also be used in the operation of a single valve cooperating with a single port.

The respective edges 23 of the furnace gas ducts 13R and 13L stand in opposed relation to the respective valve seats 17R and 17L and define a valve assembly chamber 24 in which valves 25R and 25L respectively are adapted to move so as to overlie the respective ports in their said respective valve seats. Each valve 25 may comprise a hollow generally rectangular body 26 through the interior of which cooling water or other fluid may be circulated through pipes 27 as shown in Figure 2. Flexible hoses 28 are connected to the respective pipes 27 so that as each valve 25 slides on its respective valve seat a corresponding sliding movement of the pipes 27 associated with each such valve takes up or adds slack, as the case may be, to the flexible hoses 28 connected to those pipes 27. Each valve 25 is also provided with a pair of ears 29 between which a pivot pin 30 extends. A cable anchor 31 is pivotally connected to each pin 30. The movement of each valve 25 is respectively effected by means of cables 32R and 32L, respectively. Each cable may be a flexible rope or wire or other suitable material or a chain as desired.

A continuous integral edge 33 extending toward the respective valve seats on each valve 25 seals the respective ports when fully closed by such valves. The length of each valve 25 in the direction of its movement is insufficient in the embodiment shown in Figures 1 to 3 to close more than one of the two ports in a valve seat at a time. Hence, when the furnace in the embodiment so shown is to be bottled up the ports 21a and 21b are respectively closed by the valves 25L and 25R while a separate valve or damper, not illustrated, is used to shut off the admission of air which otherwise would enter a neck 34 in an air inlet box 35. The edges of box 35 are sealed to the masonry 16 and the back of the upper part of the respective valve seats so that any air entering box 35 can only pass through whichever of the ports 21b or 22b may be open. A housing member 36 together with a cover plate 37 which is affixed not only to housing member 36 but also to the respective tops of the valve seats 17R and 17L provide the structural housing members which complete the enclosure comprising valve chamber 24. The space, if any, between the respective valve seats above the top of box 35 is also closed by a plate or other suitable means. Hence, in reversing furnace 10, when valve 25L overlies port 21a and valve 25R closes port 22b, the respective cables 32R and 32L will be up and down respectively. Conversely, in the other part of a reversing cycle, valve 25R will first move down to close port 22a after which valve 25L will be raised to close port 21b, causing air to enter duct 13R through port 22b while furnace gas will exhaust through duct 13L, port 21a and stack duct 15L. In bottling up furnace 10 as aforesaid, both cables 32 will be down closing the respective ports 21a and 22b and the admission of air will be shut off during the duration of the bottling up period. While in the described embodiment the valves 25 are sliding valves moving along straight paths, the invention may be equally applied, by example, to valves which are pivotally supported and moved in an arcuate manner between ports controlled thereby by flexible cables. A series of relatively close fitting washers or collars 38 are attached to cover 37 around the openings through which the pipes 27 and cables 32 pass in order to minimize any escape of air or gas out of chamber 24 around said pipes and cables.

Unit 12 may be preassembled and comprise a pair of spaced channels 39 to which a platform 40 is riveted, welded or otherwise affixed. The lower flanges of the channels 39 engage and are connected to housing member 37 and an angle 41 forming a structural part of the valve assembly 11 as shown in Figure 3. Openings 42 in platform 40 permit the cables 32 to extend therethrough into a housing 43 mounted on and supported by platform 40, housing 43 having flanges 44 bolted to the platform or support 40. Extending inwardly relative to and supported from the front and back walls of housing 43 are two pairs of aligned bearings 45. A guiding member 46R in the form of a sheave is rotatably mounted in the right-hand pair of bearings 45 while a similar guiding member 46L is rotatably journaled in the left-hand pair of bearings 45. Sheave 46R supportably engages cable member 32R directly above openings 42 and 37 through which it passes. Cable 32R is reeved around the groove in the periphery of sheave 46R. Cable 32R thus passes upwardly and inwardly, a change of direction taking place as shown in Figure 2 around the portion of sheave 46R with which it is in contact. Similarly, cable member 32L is engaged by sheave 46L, the inward ends of the two cable members 32R and 32L extending in opposed relation in the guiding plane of rotation defined by the center line of the grooves in the respective sheaves 46. The adjacent inner ends of the cables 32R and 32L are secured by a fastener 47. The cable members 32R and 32L are in separate lengths of cable for convenience in installing and fastening them. However, a single length of cable 32 may extend between the respective anchors 31 and be fastened in the center by a suitable fastener or clamp.

Fastener 47 comprises a side bar 48 and a pair of opposed bars 48a to form a generally T-shaped groove 48b therebetween. The bars are welded or otherwise affixed to a drum 49 of hollow cylindrical construction. The ends of the respective cables 32 enter the head of groove 48b from opposite sides thereof and make a 90° turn between the bars 48a. The rounded corners 48c on the bars 48a prevent chafing of the cables. Bars 48a are drilled so that a clamp plate 47a which is correspondingly drilled may be bolted to bars 48a and drum 49 by the bolts 47b. In this way, the cable ends are firmly held in position.

Drum 49 has a cylindrical exterior surface 50 around at least the sides and lower portions thereof and is welded by means of its edges and supports 49a at one end thereof to the adjacent wall of housing 43. The opposite wall of housing 43 is provided with a window 51 through which a shaft 52 of a drive unit 53 extends into the interior of housing 43 and of drum 49. The top portion of drum 49 may be flattened as shown in Figure 2 and holds each cable 32 in a straight line between its respective sheave 46 and fastener 47.

Drive unit 53 may comprise a conventional worm gear speed reducer 54 suitably mounted in a pedestal 55 on support 40. An input shaft 56 is connected to a shaft 57 through a suitable flexible coupling 58. Shaft 57 is the drive shaft of a reversible electric motor 59 which may be provided with a braking wheel 60 or the brake may be built into the motor 59 in conventional manner. A brake shoe actuator 61 extends from casing 62 to cause a brake shoe to normally engage wheel 60 by means of a spring to quickly stop motor 59 whenever the electric power to motor 59 is turned off. The brake is released electromagnetically whenever power is supplied to motor 59.

A rocking arm 63 is provided with a hub 64 which is keyed to shaft 52 so that the outer end of arm 63 may be rotated in a path generally concentric with and around the exterior of drum 49. The extreme end of shaft 52 may be reduced and have a pinion 65 keyed thereto. Another pinion 66 is in meshing engagement with gear 65. Gear 66 is keyed to shaft 67 of a conventional rotary cam type switch mechanism 68 mounted on a bracket 69 fastened to support 40. Shaft 67 extends through an opening in the wall of housing 43 adjacent to shaft 67 and a recess 70 in the lower outer edge of drum 49 provides space for the positioning and operation of shaft 67 and gear 66.

A roller 71 is provided with a groove 72 which lies in the plane of rotation of the sheaves 46 as defined by the center line of their respective grooves. The hub of roller 71 surrounds a bolt shaft 73 bolted to the outer end of arm 63. Roller bearings 74 may be provided between the inside of the hub of roller 71 and the pivot 73.

In operation, under the control of a suitable electrical control circuit, roller 71 may in the course of an operation cycle be moved into a series of positions as illustrated in Figure 8. Thus, if an operation is started with both valves 25 closing the respective ports 21a and 22a, the arm 63 and roller 71 may be in the middle or neutral position MM illustrated in solid lines in the aforesaid Figure 8. As shown, the neutral position will extend a number of angular degrees on each side of a vertical center line through the axis of shaft 52 within which sheave 71 will not engage and bend either cable 32.

However, in beginning an operation if roller 71 is rocked from position MM to the right (clockwise in Figure 8) to a limit position LL, the cable member 32L will be laterally displaced and caused to assume the position shown in chain lines by the numeral 32LL and valve seat 25L will uncover port 21a and close port 21b. Cable member 32R, on the other hand, will not be moved and hence valve 25R is not changed in position and will cover port 22a. The lateral displacement of cable member 32L into the position 32LL wraps cable 32L into the form of a reverse angle or bend around the right-hand side of drum 49 as viewed in Figure 8 and around the major portion of the exterior of roller 71 when in its LL position. During whatever dwell is provided for roller 71 in position LL, air will enter the furnace through port 22b and duct 13R while furnace gas from the other side of the furnace will exit through duct 13L and port 21a.

Conversely, if in the next step of the reversing cycle roller 71 is swung by arm 63 to the left (that is, counterclockwise in Figure 8) through position MM to its limit position RR on the other side, the cable member 32R will be laterally displaced and caused to assume the position shown in chain lines by the numeral 32RR. Thereby valve 25L will first uncover port 21b and close port 21a following which valve 25R will uncover port 22a and close port 22b. The lateral displacement of cable 32R into the position 32RR wraps it around the left-hand side of the exterior of drum 49 as viewed in Figure 8 around a major portion of the periphery of roller 71 when in its RR position. Thereby, the furnace will be reversed and air will now enter through port 21b and duct 13L while furnace gas will exit through duct 13R and port 22a. As will be well understood, the angular rotation of arm 63 in either direction to its extreme limit position will be predetermined and set in accordance with the particular equipment used and the needs of the particular operation to be conducted. It is evident that arm 63 is operated usually so as never to make a complete circle around the axis of shaft 52 when moved in either one direction.

Whenever the furnace is to be bottled up, if the operation being conducted is of that type, arm 63 can be stopped in position MM, at the proper time in the operation, shutting off ports 21a and 22a which when the valve in the air line leading into box 35 is also shut off will produce the desired bottling effect for the selected bottling-up period.

It will be apparent that the foregoing operation provides a considerable valve travel for each valve 25 for a relatively small volume of space occupied by the new valve operator mechanism. Further, it will be apparent that the cooperation of the curved surfaces of roller 71 and of drum 49 causes the respective cable 32 acted upon to be wrapped around the engaging parts and bent without damage to the cable and with a material change in the position of the valve connected thereto. Because of the use of the guide members 46, the lateral displacement of the respective cable members 32 by rollers 71 between sheaves 46 and drum 49 permits the valves 25 to travel on their respective seats in straight-line directions. In general, the extent of travel of the valves 25 will be dictated by the placement of the ports in the respective valve seats 17 just as the duration and order of the cycle steps will be provided in accordance with the needs of the particular operation.

As will be well understood by those in the electrical wiring art, a number of suitable circuits may be provided to control the new valve operator mechanism of this invention in whatever timing sequence and angular swing of arm 63 is desired for the particular operation being conducted. Moreover, with the arm 63 stopped in neutral position MM at the end of an operation, a new operation may be initiated in whatever direction that it is desired to have the cycle begin. One relatively simple circuit for that purpose might, for example, involve the use of a squirrel cage polyphase induction motor for motor 59 having a high slip and high starting torque characteristic together with a magnetic reversing starter controller. During the movement of motor 59 a solenoid connected across the motor would be operative to release brake 60 in a conventional manner. After initiation of a new operation from position MM, for example, in whichever of the two directions of rotation is desired, the movement of the motor would be transmitted through gear reducer 54 to shaft 67 of switch mechanism 68 which would automatically operate the cycle in the appropriate sequence and with the appropriate angular swing back and forth of arm 63. One common expedient would be to provide mechanism 68 with conventional rotating cams keyed to shaft 67 and operative against circuit switches mounted within the case of mechanism 68. The angular positioning of these cams on shaft 67 and the consequent timing action of the switches in switch mechanism 68 would be used through an appropriate electrical network to limit the maximum swing in either direction of arm 63, to reverse the swing if a reversing operation is being conducted and to provide by suitable circuit timers for whatever dwells are desired in any particular position or positions of arm 63. If desired, signal lights could also be operated in conventional manner by means of others of such rotating cams to indicate the angular position of arm 63 and the direction of its movement.

Figure 10:
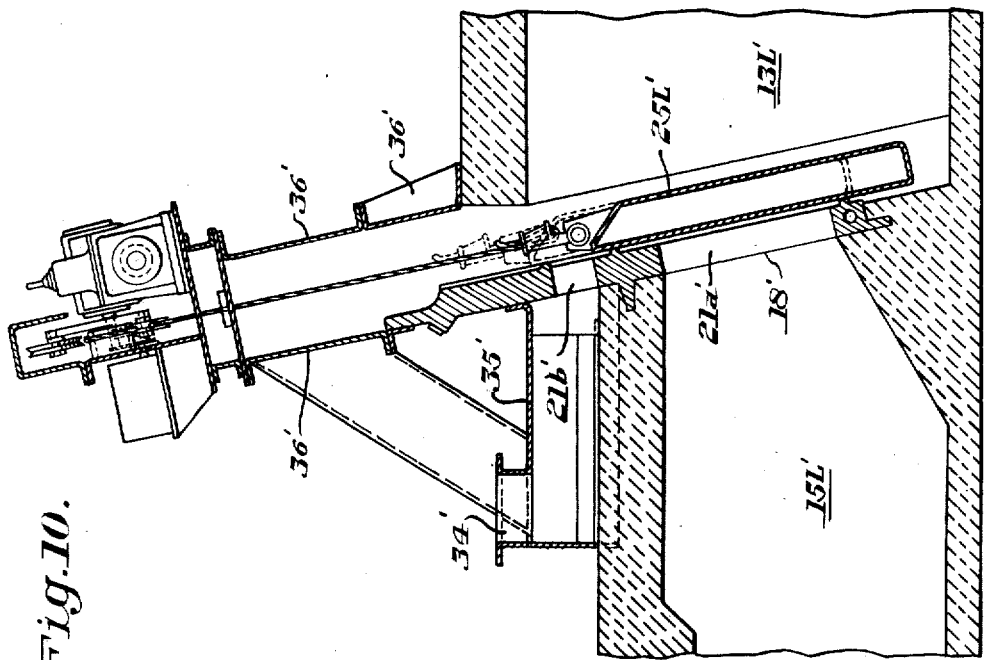
Figure 10 is a view in elevation similar to the view shown in Figure 3, of that embodiment of my invention disclosed in Figure 9.

A further embodiment of this invention is illustrated in Figures 9 and 10, having parts corresponding to parts of the embodiment illustrated in Figures 1 to 5 in general construction, function and purpose and similarly numbered with the addition of primes thereto. However, the respective valves 25R' and 25L' have a dimension along the line of their path of travel along enough to respectively close both of their respective ports when arm 63' is in its middle or intermediate position MM' as shown in Figure 11. Thus, valve 25L' is long enough to overlie the ports 21a' and 21b' when in such position and similarly, valve 25R' would overlie the ports 22a' and 22b'. With both valves in such a position, the furnace would be bottled up by the one pair of valves 25' since neither air would be admitted to either side of the furnace nor any furnace gas exit through the respective exhaust ducts. Hence such a construction dispenses with any need for the provision or operation of an independent valve or damper in the line admitting air to air box 35'.

Figure 12:
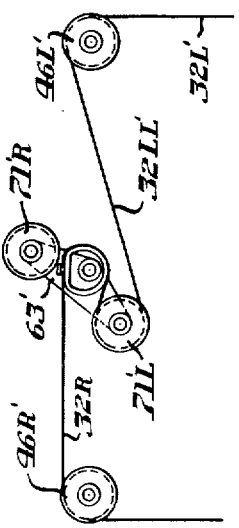
Figure 13:
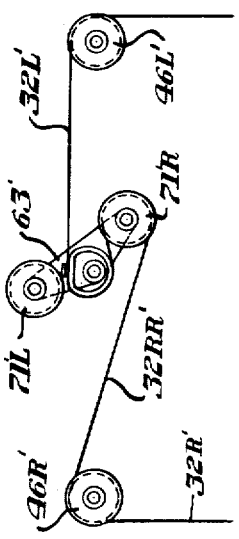

Another difference in the further embodiment of Figures 9 and 10 is that arm 63' is generally T-shaped and carries two rollers 71' thereon at the respectively extreme ends thereof, such rollers being numbered 71R' and 71L' and capable of engaging both cables 32' at the same time. In the Figure 11 position, all ports are closed by valves 25' and will effect a bottling up if during an operating period of the furnace 10'. If arm 63' is rocked in a clockwise direction from the position shown in Figure 11 to a limit position as shown in Figure 12, cable 32L' assumes the position 32LL' raising the valve 25L' from the dotted position shown in Figure 10 upwardly so as to uncover or open port 21a' while port 21b' remains closed thereby. At the same time cable 32R' is released so that it becomes a straight line between sheave 46R' and fastener 47' so that, thereby, valve 25R' is lowered moving from a similar position closing both its ports to open port 22b' while port 22a' remains closed. When the direction of rotation of arm 63' is reversed in direction and rocked counterclockwise from its Figure 12 position to its Figure 13 position a reversal of flow is effected. In the Figure 13 position, cable 32R' is caused to assume its position 32RR' while cable 32L' is released to become a straight line between drum 49' and sheave 46L'. Under these last-mentioned conditions, air enters port 21b' and duct 13L' as shown in full line section in Figure 10 while furnace gas exhausts through 13R', port 22a' and stack duct 15R'.

Various changes may be made in the construction of this invention without departing from the spirit thereof or the scope of the appended claims.

I claim:

1. In a valve operator system for a furnace or the like having a pair of slidable valves operated by a cable member in a generally symmetrical alternating arrangement, a valve seat for each of said valves having ports therein, said valves being of sufficient dimension to overlie all of their respective ports when in a middle position, in combination, fastening means positioned in an intermediate position, a cable member connected to said fastening means, rocking means pivotally mounted adjacent said fastening means, spaced rollers on said rocking means in lateral displacement engagement with both said cable members when said rocking means is in its middle position on the respective sides of said fastening means, and means for rotating said rocking means in either direction to further laterally displace one of said cable members and release the other respectively.

2. In combination, a pair of gravity-influenced members, a cable supportably engaging each of said members, a fixed support, means for fastening an end of said cables to said support at a distance from said members respectively, a reversible motor positioned adjacent said first-mentioned means, an arm connected to said motor for angular movement thereby above said support, means on said arm movable into engagement with said cables respectively between said first-mentioned means and said members, said last-mentioned means further being movable into position out of engagement with said cables, respectively.

3. In combination, a pair of alternative gravity-influenced members, a cable portion supportably engaging each of said members, a fixed clamp to anchor said cable portions, said clamp being spaced from each of said members, said cable portions extending toward said members on respectively opposite sides of said clamp, a reversible motor positioned adjacent said clamp, an arm connected to said motor for selective positioning in an angular arcuate path extending partly around said clamp, said angular path intersecting the axes of said cable portions on each side when said cable portions respectively are out of engagement with said arm, and means to regulate the direction and extent of movement of said arm by said motor.

4. In an operator system, in combination, a cable connected at one end to a device to move it thereby, a fixed clamp engaging said cable at its other end at a distance from said device a guiding member engaging said cable intermediate said device and said clamp, a rotatable member engageable generally laterally with said cable between said member and said clamp to change the position of said device, and a cylindrically surfaced member positioned spaced from said first-named member to provide a wrapping surface for said cable when it is engaged and bent by said first-named member.

5. In an operator, in combination, a cable connected to a device to be moved by said cable, a fixed non-rotatable drum positioned a spaced distance from said device, means for fastening the other end of said cable to said drum, a sheave engaging said cable between said device and said drum to bend said cable, a rocking arm having its axis generally coincident with the axis of said drum, a grooved roller pivoted to said arm and adapted to engage said cable and wrap a portion thereof around said drum at predetermined times in the course of moving said cable, and means for selectively moving said arm and roller into and out of engagement with said cable.

6. In an operator system, in combination, a cable connected to a pair of devices, a fixed fastener connected to said cable and positioned in an intermediate position relative to said cable and devices, an arcuately movable member adjacent said fastener and movable into and out of engagement with said cable on each side of said fastener to move said cable respectively to each such side, and regulatable means to selectively move said member.

7. In a valve operator system having a valve assembly chamber, a pair of valve seats in generally symmetrical arrangement in said chamber, a pair of ports in superposed relation extending through each of said seats, a valve movable by a cable on each of said seats, in combination, a cable, a fixed fastener connected to the adjacent ends of the respective cables, a movable member to engage said cables selectively a spaced distance away from said fastener on each side thereof respectively to laterally displace said cables, and means to reciprocate said movable member to cause its selective engagement with said cables.

8. In a valve operator system for a furnace or the like, having a pair of valves operated by a cable member, in combination, fastening means positioned in a single intermediate location, a cable member connected to said fastening means, rockable means positioned adjacent said cable members to laterally displace both said cable members in one position of said rockable member and to laterally displace alternate ones of said cable members when rotated in opposite directions from said one position, and means to regulate the time and extent of movement of said rockable means.

References Cited in the file of this patent

UNITED STATES PATENTS

| | | |
|---|---|---|
| 133,256 | Ritter | Nov. 19, 1872 |
| 379,277 | James | Mar. 13, 1888 |
| 413,407 | Miller | Oct. 22, 1889 |
| 420,692 | Miller | Feb. 4, 1890 |
| 632,265 | Horton | Sept. 5, 1899 |
| 1,251,788 | Knox | Jan. 1, 1918 |
| 1,269,343 | Wacker | June 11, 1918 |
| 1,328,252 | Fuller | Jan. 13, 1920 |
| 1,430,172 | McIntire | Sept. 26, 1922 |
| 1,691,397 | Lockwood | Nov. 13, 1928 |
| 2,211,988 | Rice | Aug. 20, 1940 |

FOREIGN PATENTS

| | | |
|---|---|---|
| 330,873 | Great Britain | June 19, 1930 |

UNITED STATES PATENT OFFICE

CERTIFICATE OF CORRECTION

Patent No. 2,808,849                                                           October 8, 1957

Edward W. Pottmeyer

It is hereby certified that error appears in the printed specification of the above numbered patent requiring correction and that the said Letters Patent should read as corrected below.

Column 4, line 44, for "actautor" read -- actuator --; column 6, line 40, for "along" read -- long --; column 7, line 53, after "device" insert a comma.

Signed and sealed this 19th day of November 1957.

(SEAL)
Attest:

KARL H. AXLINE
Attesting Officer

ROBERT C. WATSON
Commissioner of Patents